United States Patent [19]

Carter

[11] Patent Number: 4,924,904
[45] Date of Patent: May 15, 1990

[54] ADJUSTABLE PRESSURE REGULATOR DEVICE

[75] Inventor: William Carter, Indianapolis, Ind.

[73] Assignee: Puritan-Bennett Corporation, Overland Park, Kans.

[21] Appl. No.: 880,275

[22] Filed: Jun. 30, 1986

[51] Int. Cl.$^5$ ............................................. F16K 31/22
[52] U.S. Cl. ........................... 137/505.11; 137/505.25
[58] Field of Search ...................... 137/505.11, 505.25, 137/116.3

[56] References Cited

U.S. PATENT DOCUMENTS

| | | | |
|---|---|---|---|
| 614,441 | 11/1898 | Burnett | 137/505.25 |
| 2,935,083 | 5/1960 | Singer | 137/505.25 |
| 3,848,631 | 11/1974 | Fallon | 137/505.25 X |
| 3,890,999 | 6/1975 | Moskow | 137/505.25 |
| 4,015,630 | 4/1977 | Contreras | 137/505.25 |
| 4,020,863 | 5/1977 | Fabish | 137/505.25 X |

FOREIGN PATENT DOCUMENTS 1289524 9/1972 United Kingdom ........... 137/505.11

Primary Examiner—John Rivell
Attorney, Agent, or Firm—Robert A. Spray

[57] ABSTRACT

A pressure regulator, of a type having a spring whose compressive force is a factor of the differential of pressure achieved as to the outlet pressure in comparison to the inlet pressure, and whose adjustment of spring pressure achieves a variation of the pressure differential, with the present concepts providing a screw-type camming feature for easily imposing whatever pre-load is desired on the spring to achieve the desired pressure differential of fluid being dispensed by the regulator. The casing is provided with a window through which a tool may be easily passed to give the rotational torque for this camming effect by which the pressure differential adjustment is achieved; and the camming effect provides axial spring-load adjustment by an easily applied rotational torque to an adjustment plate, or to the abutment plate which provides a relief valve function.

23 Claims, 2 Drawing Sheets

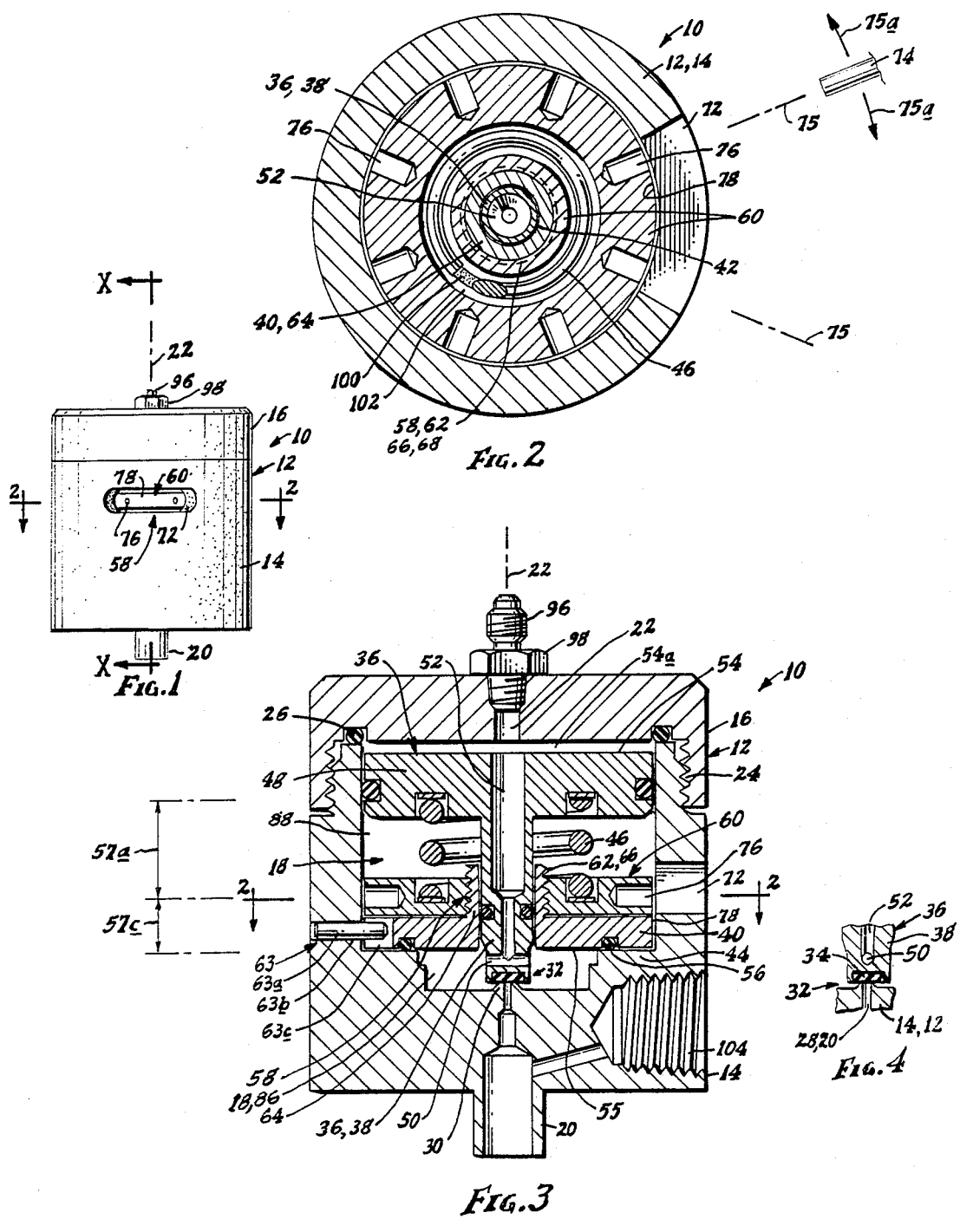

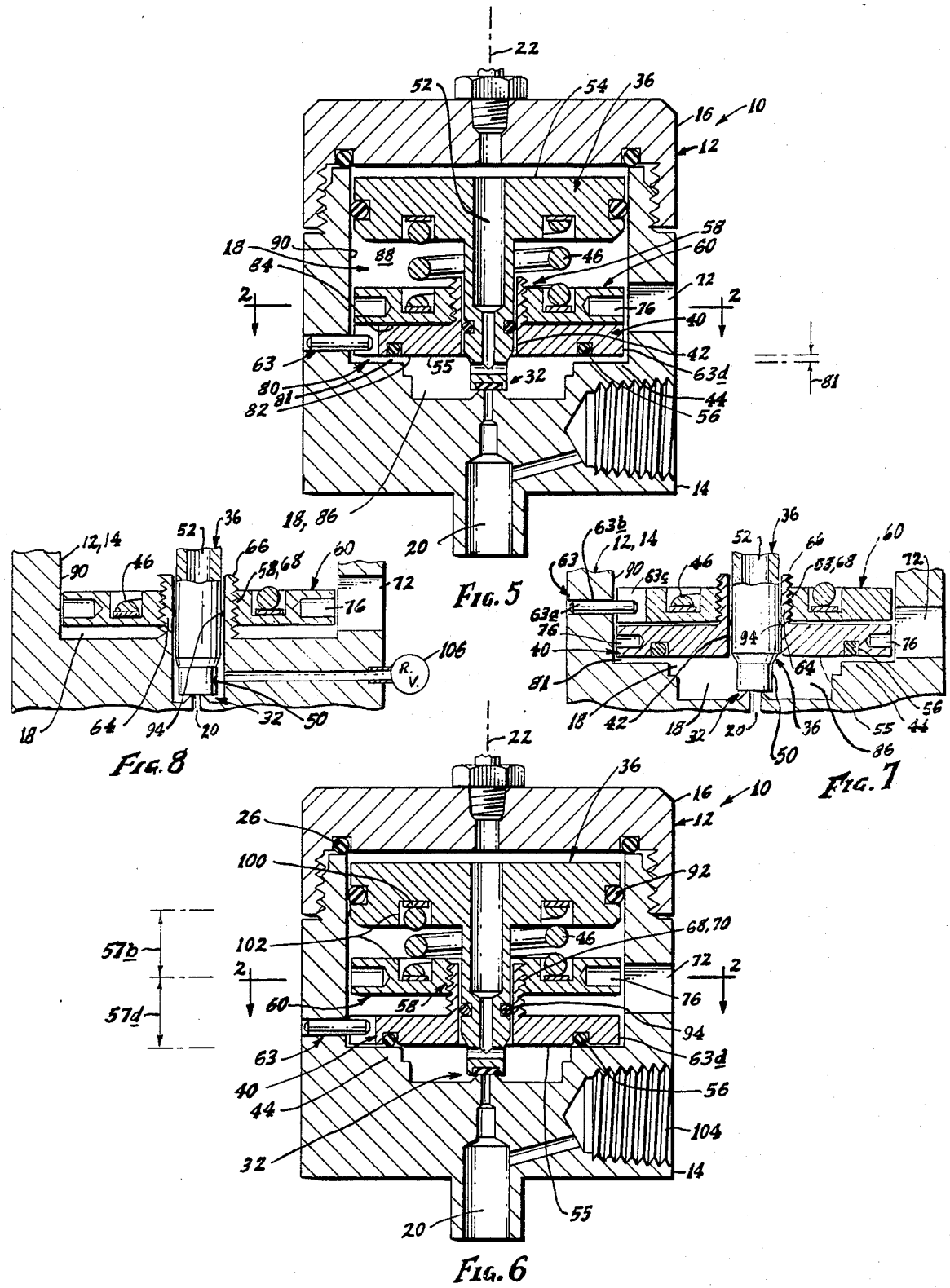

ADJUSTABLE PRESSURE REGULATOR DEVICE

FIELD AND BACKGROUND OF THE INVENTION

The present invention relates to pressure regulators for fluid supply lines, here illustrated by a device by which a supply of compressed air is dispensed at a much lower pressure compatible with the intended use, and with whatever is the equipment for the utilization, of the compressed air or other fluid.

More particularly, the invention relates to an advantageous improvement in pressure regulators of a type which utilize a coil spring as a component for the achievement of a pressure differential between the inlet pressure and outlet pressure, and which permit a shimming of the spring to give a selected pre-load to the spring for varying the pressure differential attained by the device.

It is particularly with that type of pressure regulator, i.e., a pressure regulator having a pre-loadable control spring, the present invention is here set forth and illustrated; and although pressure regulators as thus designated are themselves well-known in the prior art, such pressure regulators have posed an adjustability problem as herein discussed as helping to show not only the field and background of the present invention but a better realization of the nature of the inventive concepts.

DIFFICULTIES OF THIS TYPE PRESSURE REGULATORS OF THE PRIOR ART

As already indicated, the prior art has long had pressure regulators embodying coil springs to help achieve a pressure differential between the inlet and outlet; and it has long been known that a shimming procedure can provide a desired pressure differential adjustment, by a procedure of pre-loading the device's control spring to achieve increments of pressure differential, depending on the increment of pre-loading.

However, this type of pressure regulators has posed the problem, prior to the present invention, of a difficulty and inconvenience of attaining a desired pre-loading of the regulator's control spring. More particularly, the prior art has endured with a plurality of difficulties of achieving the desired spring pre-loading, per difficulties as now illustrated.

For one thing, the prior art procedure of spring-load adjustment has had the bother of the difficulty to sufficiently dismantle the prior art regulator casing so as to be able to gain access to the coil spring; and this difficulty of access causes delays of use, labor, time, labor cost, etc., as are surely quite apparent.

Further, it has been difficult to get proper pressure differential, for a shimming procedure does not usually provide an infinite variability option or capability, but only an adjustment by specific increments depending on the size and shape and availability of shimming bodies for such use; and this is especially a problem since the shimming procedure inherently meant some "trial and error" repetitions of the attempt, and because the need to dis-assemble and re-assemble (recalling the access problem mentioned above) has made each trial-and-error step of significant bother and effort, even to get only reasonably close to a desired regulation to get a specific pressure differential.

THE INVENTIVE CONCEPTS, SUMMARIZED

In contrast to prior art methods noted above, requiring a dismantling for access, and of shimming by bodies forced against the control spring to adjust its pressure effect, the present invention provides a rotational adjustment plate, with a screw-thread camming feature operative between it and an abutment plate, by means of which rotational effort applied to the adjustment plate achieves its controlled axial movement which adjusts the pre-loading condition of the control spring.

The adjustment is not only easy, but it gives an infinite option of adjustment in contrast to incremental steps of adjustment; and it is easily made without any interruption of the fluid delivery, as was the situation with prior art procedures requiring a dis-assembly for access. Here the only access needed is to reach the adjustment plate, and that is made to be quite easy by the provision of an access window in the device's casing or shell.

Other embodiments are also shown, achieving an axial spring-length adjustment by a camming effect of a rotational movement.

BRIEF DESCRIPTION OF THE DRAWINGS

The above description of the novel pressure regulator is of somewhat introductory and generalized form. More particular details, concepts, and features are set forth in the following and more detailed description of illustrative embodiments taken in conjunction with the accompanying drawings, which are of somewhat schematic and diagrammatic nature, for showing of the inventive concepts and contrasting them with the prior art, as well as illustrating the use of the components of the pressure regulator in different conditions of adjustment and effect requirements and problems of the operational conditions.

In the drawings:

FIG. 1 is an elevational view of a pressure regulator device according to concepts of the present invention and providing its advantages as specified herein, according to a first embodiment;

FIGS. 2-6 are views thereof, or of details thereof, as mentioned below, all of FIGS. 2-6 being in substantially the same scale, being about twice the scale of that of FIG. 1; and FIGS. 3, 5, and 6 are cross-sectional views taken generally by Section-line X—X of FIG. 2;

FIG. 2 is a cross-sectional view, generally as taken by Section-line 2—2 of FIGS. 1, 3, 5, and 6;

FIGS. 3 and 6 are a cross-sectional views as noted above, differing in that FIG. 3 illustrates a relaxed spring compression adjustment, thus illustrating as adjustment of relatively low output pressure, i.e., a setting for relatively high pressure differential, whereas FIG. 6 illustrates a relatively tight spring compression adjustment, thus illustrating an adjustment of relatively high output pressure, i.e., a setting for relatively lesser pressure differential;

FIG. 4 is a detail view of the valve-closing end of the piston means of FIGS. 2, 3, and 5-7;

FIG. 5 is a cross-sectional view illustrating the relief valve feature provided in this embodiment, the abutment plate being shown in FIG. 5 as having moved away from the seated position of FIGS. 3 and 6; and FIG. 7 illustrates the camming thrust being achieved from the abutment plate, but in contrast to FIGS. 1-6, in FIG. 7 the rotational actuator body for achieving the camming effect is the abutment plate, and the adjustment plate is the one keyed non-rotationally to the casing although axially movable with respect to it.

(In all of FIGS. 3, 5,6 and 7 the device is shown with pressure applied at the inlet rather than at rest, although in FIGS. 3 and 6 not enough pressure to actuate the pressure-relief venting function shown as the condition in FIGS. 5 and 7.)

DETAILED DESCRIPTION OF PREFERRED EMBODIMENT

As shown in the drawings, the invention provides novel concepts achieving a new and advantageous pressure regulator 10, particularly for dispensing a stream of fluid at any optionally-selected reduced pressure as may be desired in whatever is the application of use where provision of reduced pressure, even substantially reduced pressure, is desired, in a dispensing line for compressed air or other gas, or a liquid.

The first embodiment, shown illustratively in FIGS. 1-6, is preferred in a sense of its attainment of the novel spring adjustability in combination with a pressure-relief function by an economical plate feature already used in the prior art, here using that plate for an extra function of providing the camming thrust for axial spring-adjustment, as shown below; but an overall preference among the various embodiments may depend upon a consideration of manufacturing economies, sales appeal, etc., and perhaps operating conditions and other factors not fully predicatable, which may cause a favoring of one embodiment over another.

(Prior to giving the numerical description of details and features, it is mentioned that although all reference numerals consistently identify the same component or feature in the various Figures, the reference numerals are not always duplicated in all views; and this is for the sake of clarity and not obscuring details of the drawings, for all of the FIGS. 1-6 depict the identical device 10 and identical components and features thereof, even though as mentioned above in the brief description of the Figures of the drawings the device 10 is shown in different operating conditions in FIGS. 3,5 and 6, yet the identity of the components and features is quite apparent in the drawings of those Figures. The same applies to the embodiment of FIG. 7.)

The most apparent component of the device 10 is its outer shell or casing 12 which provides and serves as an enclosing body member means 12, shown as of two parts or bodies 14 and 16 and having a hollow interior chamber 18. The casing part 14 is shown as the one provided with an inlet 20, and the casing part 16 is shown as provided with an outlet 22, the parts 14 and 16 being shown as connected by screw thread connection 24 sealed by a sealing ring 26.

The inlet passage 28 which extends inwardly from inlet 20 to the interior chamber 18 is provided as a valve seat 30; and, for a valve means 32 for controlling flow of the fluid stream inwardly into the chamber 18 there is provided a movable valve-closure member 34.

The valve-closure member 34 is shown as carried by a piston means 36 located in and axially movable in the chamber 18, the piston means 36 being movable axially within the chamber 18 both toward the inlet 20 and the outlet 22 in its operativity specified herein in the opening and closing of the valve means 32, for the piston means 36 carries the movable valve-closing member 34 of the valve means 32 on the shank portion 38 of the piston means 36, to reduce the pressure as herein specified.

There is an abutment plate 40 in the chamber 18, its central opening 42 permitting plate 40 to be sleeved around the piston shank 38, and the abutment plate 40 operatively abuts the body member 12(14) by engaging an inwardly extending ledge or abutment 44 thereof, that engagement providing that movement of the abutment plate 40 toward the inlet 20 is blocked, and with operativity as further specified herein.

The pressure-reduction feature in this type device 10, and more particularly its adjustability, is provided by a spring means 46 shown as operatively bottomed between the piston head 48 of the piston means 36 and the abutment plate 40, that bottoming against the abutment plate 40 being more particularly specified herein as per the inventive concepts; and the operative bottoming of the spring 46 against the abutment plate 40 biases the piston means 36 toward the outlet 22, thus in a direction (upwardly as shown) to open the valve means 32.

Any opening of valve means 32 permits fluid to pass by the valve seat 30 into the chamber 18, but only at a very reduced pressure due to the limited nature of the opening of the valve 32. The specific amount of that pressure reduction is as further specified herein, and as made adjustable by the inventive concepts particularly specified herein.

The reduced-pressure fluid, after entering the chamber 18 past the valve means 32, enters inwardly of piston shank 38 through radial holes 50 diametrically provided in the shank 38; and holes 50 are communicated interiorly of the piston shank 38 by an axial hole 52 in the piston shank 38, that hole 52 emerging outwardly of the outlet face 54 of the piston head 48 in the region 54a of the outlet 22.

Thus, through those openings 50 and 52 the piston means 36 provides communication of the fluid stream from the valve means 32 to the outlet 22.

In this type pressure regulator 10, it is to be noted that the pressure-responsive area 54 of the piston head 48 of piston means 36, i.e., the portion of the piston 36 adjacent the outlet 22 and exposed to pressure in the (upper) space 54a, and thus urging the piston 36 (downwardly) toward valve-closure, is larger than the area 55 within the confines of an O-ring 56 carried by the abutment plate 40, which sealing against ledge 44 by the O-ring 56 defines the pressure-responsive area, from the standpoint of pressure force of outlet pressure, of the abutment plate 40 in the region of chamber 18 adjacent the inlet 20, which pressure urges the piston (upwardly) in a valve-opening direction; and this difference in operative area (54 v. 55) thereby provides that the fluid pressure in chamber 18 in the space 54a between the outlet 22 and the head 48 of the piston means 36 acts against the piston means 36 to produce a force which acts through the piston's shank 38 and valve-closure member 34 to close the valve means 32 against the combined force of both the spring means 46 and the force of the fluid pressure which exists in the space between the abutment plate 40 and the inlet 20 and acts against the abutment plate 40's portion 55, it being recalled that the O-ring 56 acts to limit the force (upwardly as shown) against the abutment plate 40 to merely that caused by pressure against the limited area 55.

Further as to this type of pressure regulator 10, any forced compression of the spring means 46 by any forcing the spring means 46 away from the abutment plate 40, which added compression thereby serves to add to the overall force as just designated which acts to open the valve means 32, thus causes the pressure at outlet 22 to be correspondingly higher than without such compression of the spring means 46.

The illustrative compression-force adjustment of the spring 46 is easily noted by observing the difference in the length of the spring 46 in FIGS. 3 and 6, i.e., contrasting the spring-length dimension 57a in FIG. 3 and the spring-length dimension 57b in FIG. 6, and also in those Figures by noticing that in FIG. 6 the (lower) end of the spring 46 adjacent the inlet 20 has been moved off (upwardly) of the abutment plate 40 as is illustrated by comparing the dimensions 57c and 57d, those being the dimensions between that inlet-adjacent (lower) end of the spring 46 and the ledge, respectively in FIGS. 3 and 6.

It is this type of pre-load adjustment of the spring 46 which is advantageously provided by inventive concepts here.

According to concepts of the present invention, camming means 58 are provided for this type of pressure regulator 10, by which are achieved an optional compression of the spring means 46, easily, and in any optionally selected amount.

More particularly as shown, there is provided an adjustment plate 60 operatively between the spring means 46 and the abutment plate 40; and the cam means 58 provide means for axially moving the adjustment plate 60 relative to the abutment plate 20, in an easy manner, and here particularly in response to an application of a non-axial force to the adjustment plate 60 as specified herein.

The preferred embodiment shown in the drawings also shows that the adjustment plate 60 is both rotationally and axially movable with respect to the casing or body member means 12; and the rotation of the adjustment plate 60, causing its axial movement by the cam means 58, thereby easily provides the optional amount of compression of the spring means 46 desired to adjust the output pressure of outlet 22 by controlled regulation of the valve means 32.

More particularly as shown, the pressure-regulating cam means 58 is provided by providing a screw thread connection 62 between the adjustment plate 60 and the abutment plate 40, coupled with the provision of abutment means 63 of the casing 12 for retaining the abutment plate 40 against rotation with respect to the casing or body member means 12, thus achieving the axial relative movement of the adjustment plate 60 relative to the abutment plate 40 in response to rotation of the adjustment plate 60.

That casing abutment means 63 is shown as provided with a lug or pin 63a carried in a radial hole 63b of the casing 12(14), and the pin 63a extends into a slot 63c in the periphery 63d of the abutment plate 40, blocking rotation of the abutment plate 40 as just mentioned.

For providing the screw thread connection 62, the abutment plate 40 is shown provided with an axially-located hollow sleeve 64 through which the shank 38 of the piston means 38 extends, the threaded connection 62's screw threads 66 of the abutment plate 40 being provided on the sleeve 64, mating with threads 68 in an axial hole 70 of the adjustment plate 60.

Co-operating with the camming screw thread means 58, 62 of adjusting the outlet pressure at outlet 22, the body member casing 12 is shown provided with one or more opening means 72 in the region of the adjustment plate 60, this window-like opening 72 providing access to the adjustment plate 60 to effect its rotational movement described above by which the optional compression of the spring means 46 is achieved for the pressure-regulating effect.

Thus, to rotate the adjustment plate 60, the user need merely insert a tool 74 (FIG. 2) through the window 72, as per pathway lines 75; and since the adjustment plate 60 is provided with lug means 76 in a circumferential series, for optional engagement of the tool 74 with any of the lug means 76, it is then convenient for the user to apply rotational torque (arrows 75a) to the adjustment plate 60 to achieve the optional compression of the spring 46.

The lug means 76 are shown as provided by providing radially-disposed sockets in the periphery 78 of the adjustment plate 60; and each of the sockets 76 can be used, depending of course on which one or more of the sockets 76 happen to be registration with the window 72.

Also as shown, the camming means 58 utilizes the abutment plate 40 which is provided in a relief valve feature 80, as now detailed.

As to that relief valve feature 80, it will be noted that the abutment plate 40 is provided to be not fixed to the casing 12(14), even though as so far described in this numerical description the abutment plate 40 is considered always as abutting (by its O-ring 56) the casing ledge 44; and instead of being fixed to the casing 12, the abutment plate 40 is axially movable away from its position abutting the ledge 44 of the casing body member 12(14), in which blocked position, movement of the abutment member 40 toward the inlet 20 is shown as blocked by the ledge 44.

The illustrative pressure-relief venting 80 illustrated in FIG. 5 may be particularly noticed in the drawings by noticing that in FIG. 5 there is a dimension 81 between the inlet-adjacent (lower) face 82 of the abutment plate 40 (and the O-ring 56 carried thereon) and the ledge 44 of the casing 12(14) upon or against which the O-ring 56 is shown as seating in FIGS. 3 and 6. (That relief venting condition is also shown by the spacing 81 in FIG. 7.)

Further as to the relief valve feature 80, which may be also understood in the drawings by comparing the conditions shown in FIG. 5 with FIGS. 3 and 6 as described herein, it will be noted that the abutment opening 63c (which has already been mentioned as abuttingly co-operating with pin 63a to block the abutment plate 40 against rotation) would not provide any vent or other relief of pressure or fluid unless the pressure past the valve 32 were so high as to have raised the abutment plate 40 (O-ring 56) off the ledge 44; and in that situation the pressure would be vented anyway, past the periphery 63d of the abutment plate 40 and out the window 72. Thus, venting would then occur anyway, across the plate 40, i.e., from the upstream face 82 of the abutment plate 40 (closest to the inlet 20) clear through to the downstream face 84 of the abutment plate 40 (closest to the outlet 22). In this respect, it is to be noted that the opening 63c of the abutment plate 40 is outwardly of the portion 55 encircled by O-ring 56 of the abutment plate 40 which defines the area of fluid pressure exerting the valve-opening force on the piston means 36, in the region of the inlet 20, i.e., space 86 of the chamber 18.

Thus it is seen (FIGS. 5 and 7) that with the abutment plate 40 being movable (upwardly) off and away from the casing ledge 44, it is provided that pressure relief function is achieved. That is, if the fluid pressure in the space 86 between the abutment plate 40 and the inlet 20 is excessive, the abutment plate 40 will move off the ledge 44 the small amount, and the spring 46 will compressingly yield a small amount (81), sufficient that the excessive pressure in space 86 is vented to the face 84 of the abutment plate 40 farthest from the inlet 20; and the portion 88 of chamber 18 downstream of (above) the face 84 of abutment plate 40 is vented through the window 72, it being noted that the adjustment plate 60 does not have an airtight fit against the inner wall 90 of the casing 12, and it also being recalled that the window 72 is in the span of the adjustment plate 60.

Other components, conventional in nature, are not mentioned textually in detail because of conventional nature and quite apparent in the drawings, such as the O-rings 92 and 94, respectively, which are shown carried by the piston head 48 and piston shank 38, which provide a tight although movable seal or fit with respect to the casing's inner wall 90 and the abutment plate hole 42, respectively, the outlet nipple 96 held by nut 98, spring seat rings 100 carried in circular seats 102 which give low-friction carry of the ends of the spring 46 as it bottoms in the piston head 48 and adjustment plate 60, respectively, to avoid a twisting of the spring 46 due to the rotation of the adjustment plate 60, and a threaded hole 104 for carrying a gauge or other associated equipment to be exposed to the high inlet pressure.

It will be understood that since the prior art utilizes an abutment plate 40 as a relief valve, as above reviewed beginning with the components numbered 80 and follows, although not in the prior art keyed non-rotationally to the casing 12(14) as here done by the key or pin means 63, the present invention is shown in the preferred embodiment of FIGS. 1–6 as utilizing the presence of the abutment plate 40 for a relative rotation aspect with respect to the adjustment plate 60, to achieve the desired axial thrust of the adjustment plate 60.

Also, using an abutment plate 40 as a relief valve, the relative rotatability of it and a plate like the adjustment plate 60 may be utilized by keying the latter (plate 60, FIG. 7) to be axially but non-rotatably movable to the casing, and getting its axial thrust by rotating the plate 40 in an embodiment in which the plate 40 is not keyed to the casing. In this FIG. 7 variation, the pin 63a fits in slot 63c of adjustment plate 60; and the sockets 76 are shown provided in the abutment plate 40, with the casing window 72 lowered correspondingly.

CONCLUSION

It is thus seen that this pressure regulator device according to the inventive concepts, provides a desired, economical and advantageous device yielding the advantages of an effective pressure regulator which is easily and conveniently adjustable as to pressure differential with practically unlimited ranges, and providing in effect infinitely optional pressure control in contrast to only certain increments of adjustment, achieving in this novel combination a device and advantages not achieved by prior art devices even though they may have had certain of the concepts individually although not in the novel combination here achieved, and even though the present concepts may be incorporated in prior art pressure regulator designs quite economically.

Accordingly, it will thus be seen from the foregoing description of the invention according to these illustrative embodiments, considered with the accompanying drawings, that the present invention provides new and useful concepts in combination, which provide and achieve a novel and advantageous pressure regulator with infinitely variable pressure differential adjustability, providing advantageous features and characteristics, with high advantages of convenience, ease of pressure-adjustment changeover, safety, easy access from the exterior of the casing in contrast to having to even partially disassemble to achieve adjustment of pressure differential, etc., yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiments or form or arrangement of parts herein described or shown.

I claim:

1. A pressure regulator for a stream of fluid, the regulator being of a type and comprising features, components, and operativity as follows:
   (a) a body member means having a hollow interior chamber and provided with an inlet and an outlet,
   (b) a valve means in the chamber for controlling flow of the fluid stream inwardly into the chamber,
   (c) a piston means in the chamber and movable axially within the chamber toward the inlet and the outlet,
   (d) the piston means carrying the movable valve-closing member of the valve means,
   (e) a relief valve plate in the chamber and operatively abutting the body member means in a manner by which movement of the relief valve plate toward the inlet is blocked,
   (f) a spring means operatively bottomed between the piston means and the relief valve plate, and biasing the piston means toward the outlet and to open the valve means,
   (g) the piston means providing communication means for communication of the fluid stream from the valve means to the outlet,
   (h) the relief valve plate providing a closure of the chamber-portion downstream of the valve means and upstream of the entrance of the communication means of the piston means, the relief valve plate thus being subject to pressure in said chamber-portion and urged to venting position by the pressure in said chamber-portion, that pressure being the pressure of the regulator's outlet, by that chamber-portion and the outlet both being in communication with the communication means of the piston means,
   (i) the operative area of the piston means end adjacent the outlet being larger than the operative area of the relief valve plate adjacent the inlet, thereby providing that the fluid pressure in the space between the outlet and the piston means acts against the piston means to produce a force which acts to close the valve means against the combined force of the spring means and of the force of the fluid pressure which exists in the chamber-portion downstream of the valve means and upstream of the entrance of the communication means of the piston means, and acts against the relief valve plate,
   (j) a forced compression of the spring means by forcing the end of the spring means which is most adjacent the relief valve plate away from the relief valve plate, which thereby serves to add to the overall force acting to open the valve means, thus causing the outlet pressure to be correspondingly higher than without such compression of the spring means, (k) the spring means also biasing the relief valve plate toward a non-venting position of operatively seating against the body member means, yet permitting its axial movement, against the bias of the said spring means, in its relief valve operativity, to move axially away from its said non-venting position to a venting position to permit the venting, through opening means provided in the body member means, of fluid in the chamber-portion downstream of the valve means and upstream of the entrance of the communication means of the piston means, if the pressure in said chamber-portion is excessive.

(l) the vent opening means being provided in a portion of the body member means to vent the chamber at a location downstream of the place of engagement of the relief valve plate with the body member means when seated thereagainst in non-venting position, (m) the relief valve plate, when in its venting position away from seated engagement with the body member means, permitting communication of said chamber-portion downstream of the valve means and upstream of the entrance of the communication means of the piston means, with the said downstream portion of the chamber venting through the vent opening means, and the improvement, in combination with the relief valve plate of such a pressure regulator, of providing for optional compression of the spring means, by providing an adjustment plate contiguous to the relief valve plate and operatively between the spring means and the relief valve plate, the spring means being between the piston and the adjustment plate, there being provided means for applying non-axial force to one of the adjustment plate and the relief valve plate, and cam means operative between the relief valve plate and the adjustment plate for axially moving the adjustment plate in response to the non-axial force so applied, and providing abutment means abuttingly co-operating with the body member means for retaining, against rotation with respect to the body member means, the one of the adjustment plate and the relief valve plate other than the one which receives the non-axial force, the cam means also providing a supportive interconnection between the adjustment plate and the relief valve plate such that the spring means operatively bottoms against the relief valve plate by the operative engagement of the spring means with the adjustment plate, but permitting axial movement of the relief valve plate for its venting operativity as to excess pressure, thus providing that the application of non-axial force to the said one of the adjustment plate and relief valve plate, with the other plate being held against rotation by the abutment means, provides for adjustment of the compression of the spring means, by adjusting the relative axial position of the adjustment plate relative to the relief valve plate; yet nevertheless the relief valve plate, as biased by the spring means acting through the adjustment plate and the cam means, is movable axially toward and away from its said positions of venting and non-venting.

2. The invention as set forth in claim 1 in a combination in which the one of the adjustment plate and relief valve plate which receives the non-axial force is rotationally movable with respect to the body member means, its rotation causing the axial movement of the adjustment plate by the cam means, thereby providing the optional compression of the spring means.

3. The invention as set forth in claim 2 in a combination in which the cam means is provided by providing a screw thread.

4. The invention as set forth in claim 3 in a combination in which one of the relief valve plate and adjustment plate is provided with a hollow sleeve through which the piston means extends, one set of screw threads of the said screw thread connection being provided on the said sleeve.

5. The invention as set forth in claim 4 in a combination in which the body member means is provided with an opening means in the region of the one of the adjustment plate and relief valve plate which receives the non-axial force, providing access to the said one of the adjustment plate and relief valve plate to apply the non-axial force to thus effect axial movement of the adjustment plate by which optional compression of the spring means is achieved.

6. The invention as set forth in claim 5 in which the one of the adjustment plate and relief valve plate which receives the non-axial force is provided with lug means in a circumferential series, for optional engagement to apply rotational torque to the said one of the adjustment plate and relief valve plate to achieve the optional spring means compression.

7. The invention as set forth in claim 6 in a combination in which the lug means are provided by providing radially-disposed sockets in the periphery of the said one of the adjustment plate and relief valve plate which receives the non-axial force.

8. The invention as set forth in claim 3 in a combination in which the body member means is provided with an opening means in the region of the one of the adjustment plate and relief valve plate which receives the non-axial force, providing access to the said one of the adjustment plate and relief valve plate to apply the non-axial force to thus effect axial movement of the adjustment plate by which optional compression of the spring means is achieved.

9. The invention as set forth in claim 8 in which the one of the adjustment plate and relief valve plate which receives the non-axial force is provided with lug means in a circumferential series, for optional engagement to apply rotational torque to the said one of the adjustment plate and relief valve plate to achieve the optional spring means compression.

10. The invention as set forth in claim 9 in a combination in which the lug means are provided by providing radially-disposed sockets in the periphery of the said one of the adjustment plate and relief valve plate which receives the non-axial force.

11. The invention as set forth in claim 2 in a combination in which the body member means is provided with an opening means in the region of the one of the adjustment plate and relief valve plate which receives the non-axial force, providing access to the said one of the adjustment plate and relief valve plate to apply the non-axial force to thus effect axial movement of the adjustment plate by which optional compression of the spring means is achieved.

12. The invention as set forth in claim 11 in which the one of the adjustment plate and relief valve plate which receives the non-axial force is provided with lug means in a circumferential series, for optional engagement to apply rotational torque to the said one of the adjustment plate and relief valve plate to achieve the optional spring means compression.

13. The invention as set forth in claim 12 in a combination in which the lug means are provided by providing radially-disposed sockets in the periphery of the said one of the adjustment plate and relief valve plate which receives the non-axial force.

14. The invention as set forth in claim 1 in a combination in which the body member means is provided with an opening means in the region of the one of the adjustment plate and relief valve plate which receives the non-axial force, providing access to the said one of the adjustment plate and relief valve plate to apply the non-axial force to thus effect axial movement of the adjustment plate by which optional compression of the spring means is achieved.

15. The invention as set forth in claim 14 in which the one of the adjustment plate and relief valve plate which receives the non-axial force is provided with lug means in a circumferential series, for optional engagement to apply rotational torque to the said one of the adjustment plate and relief valve plate to achieve the optional spring means compression.

16. The invention as set forth in claim 15 in a combination in which the lug means are provided by providing radially-disposed sockets in the periphery of the said one of the adjustment plate and relief valve plate which receives the non-axial force.

17. The invention as set forth in claim 14 in a combination in which it is the adjustment plate which is provided to receive the non-axial force, and is rotationally and axially movable with respect to the body member means, its rotation causing its axial movement by the cam means, thereby providing the optional compression of the spring means.

18. The invention as set forth in claim 1 in a combination in which it is the adjustment plate which is provided to receive the non-axial force, and is rotationally and axially movable with respect to the body member means, its rotation causing its axial movement by the cam means, thereby providing the optional compression of the spring means.

19. The invention as set forth in claim 18 in a combination in which the cam means is provided by providing a screw thread connection between the adjustment plate and the relief valve plate.

20. The invention as set forth in claim 19 in a combination in which the relief valve plate is provided with a hollow sleeve through which the piston means extends, the screw threads of the relief valve plate being provided on the said sleeve.

21. A pressure regulator for a stream of fluid, the regulator being of a type and comprising features, components, and operativity as follows:
   (a) a body member means having a hollow interior chamber and provided with an inlet and an outlet,
   (b) a valve means in the chamber for controlling flow of the fluid stream inwardly into the chamber,
   (c) a piston means in the chamber and movable axially within the chamber toward the inlet and the outlet,
   (d) the piston means carrying the movable valve-closing member of the valve means,
   (e) a relief valve plate in the chamber and operatively abutting the body member means in a manner by which movement of the relief valve plate toward the inlet is blocked,
   (f) a spring means operatively bottomed between the piston means and the relief valve plate, and biasing the piston means toward the outlet and to open the valve means,
   (g) the piston means providing communication means for communication of the fluid stream from the valve means to the outlet,
   (h) the relief valve plate providing a closure of the chamber-portion downstream of the valve means and upstream of the entrance of the communication means of the piston means, the relief valve plate thus being subject to pressure in said chamber-portion and urged to venting position by the pressure in said chamber-portion, that pressure being the pressure of the regulator's outlet, by that chamber-portion and the outlet both being in communication with the communication means of the piston means,
   (i) the operative area of the piston means end adjacent the outlet being larger than the operative area of the relief valve plate adjacent the inlet, thereby providing that the fluid pressure in the space between the outlet and the piston means acts against the piston means to produce a force which acts to close the valve means against the combined force of the spring means and of the force of the fluid pressure which exists in the chamber-portion downstream of the valve means and upstream of the entrance of the communication means of the piston means, and acts against the relief valve plate,
   (j) a forced compression of the spring means by forcing the end of the spring means which is most adjacent the relief valve plate away from the relief valve plate, which thereby serves to add to the overall force acting to open the valve means, thus causing the outlet pressure to be correspondingly higher than without such compression of the spring means,
   (k) the spring means also biasing the relief valve plate toward a non-venting position of operatively seating against the body member means, yet permitting its axial movement, against the bias of the said spring means, in its relief valve operativity, to move axially away from its said non-venting position to a venting position to permit the venting, through opening means provided in the body member means, of fluid in the chamber-portion downstream of the valve means and upstream of the entrance of the communication means of the piston means, if the pressure in said chamber-portion is excessive,
   (l) the vent opening means being provided in a portion of the body member means to vent the chamber at a location downstream of the place of engagement of the relief valve plate with the body member means when seated thereagainst in non-venting position,
   (m) the relief valve plate, when in its venting position away from seated engagement with the body member means, permitting communication of said chamber-portion downstream of the valve means and upstream of the entrance of the communication means of the piston means, with the said downstream portion of the chamber venting through the vent opening means, and the improvement, in combination with the relief valve plate of such a pressure regulator, of providing for optional compression of the spring means, by providing an adjustment plate contiguous to the relief valve plate and operatively between the spring means and the relief valve plate, the spring means being between the piston and the adjustment plate, there being provided means for applying non-axial force to one of the adjustment plate and the relief valve plate, and cam means operative between the relief valve plate and the adjustment plate for axially moving the adjustment plate in response to the non-axial force so applied, and providing abutment means abuttingly co-operating with the body member means for retaining, against rotation with respect to the body member means, the one of the adjustment plate and the relief valve plate other than the one which receives the non-axial force, the cam means also providing a supportive interconnection between the adjustment plate and the relief valve plate such that the spring means operatively bottoms against the relief valve plate by the operative engagement of the spring means with the adjustment plate, but permitting axial movement of the relief valve plate for its venting operativity as to excess pressure, thus providing that the application of non-axial force to the said one of the adjustment plate and relief valve plate, with the other plate being held against rotation by the abutment means, provides for adjustment of the compression of the spring means, by adjusting the relative axial position of the adjustment plate relative to the relief valve plate; yet nevertheless the relief valve plate, as biased by the spring means acting through the adjustment plate and the cam means, is movable axially toward and away from its said positions of venting and non-venting.

in a combination in which it is the relief valve plate which is provided to receive the non-axial force, and the adjustment plate is the one fixed against rotation with respect to the body member means, both the relief valve plate and the adjustment plate being axially movable with respect to the body member means; thus the non-axial force when applied to the relief valve plate causes its rotation which causes axial movement of the adjustment plate by the cam means, thereby providing the optional compression of the spring means.

22. The invention as set forth in claim 21, in which the cam means is provided by providing a screw thread connection between the adjustment plate and the relief valve plate.

23. The invention as set forth in claim 22 in a combination in which the relief valve plate is provided with a hollow sleeve through which the piston means extends, the screw threads of the relief valve plate being provided on the said sleeve.

* * * * *

UNITED STATES PATENT AND TRADEMARK OFFICE
CERTIFICATE OF CORRECTION

PATENT NO. : 4,924,904
DATED : May 15, 1990
INVENTOR(S) : William Carter

It is certified that error appears in the above identified patent and that said Letters Patent is hereby corrected as shown below:

In the Drawings, delete Fig. 8 in its entirety.

Col. 1, line 24: After "spring," insert -- that --.

Col. 2, line 52: Change "as" to: -- an --.

Col. 5, line 58: After "piston means" change "38" to -- 36 --.

Col. 9, line 15: Change the period (.) to a comma (,).

Col. 10, line 10: Delete the period (.) and add:
-- connection between the adjustment plate and the relief valve plate. --.

Col. 8, line 16: Change "I Claim" to: -- Claims --.

Signed and Sealed this

Third Day of December, 1991

Attest:

HARRY F. MANBECK, JR.

Attesting Officer

Commissioner of Patents and Trademarks